March 22, 1960    P. F. SHIVERS    2,929,981
SERVOMOTOR FLIGHT CONTROL APPARATUS
Filed Feb. 3, 1947

Inventor
PAUL F. SHIVERS
George H. Fisher
Attorney

United States Patent Office 2,929,981
Patented Mar. 22, 1960

2,929,981

SERVOMOTOR FLIGHT CONTROL APPARATUS

Paul F. Shivers, Edina, Minn., assignor to Minneapolis-Honeywell Regulator Company, Minneapolis, Minn., a corporation of Delaware Application February 3, 1947, Serial No. 726,008

29 Claims. (Cl. 318—489)

This invention pertains to the control of airplanes in flight. This invention is concerned with the automatic or manual control of the control surfaces of an aircraft while in flight.

One object of this invention is to provide an improved automatic or manual control of the rudder operating means for an aircraft. In application 447,989, filed June 22, 1942, there is shown an arrangement for controlling the operating means for the rudder of an aircraft. In that arrangement a directional gyro positions a wiper of a potentiometer of a control means for controlling a rudder servo motor through a driving means comprising a friction clutch. A manually operable means is therein disclosed for also controlling the control means for the servo motor which operates the rudder. In the prior arrangement, the operation of the manual control means effects a locking of the wiper arm of the potentiometer and the friction clutch permits the directional gyro to move with respect to the wiper. In the prior arrangement, the locking means for the wiper will hold the wiper in any position which it may have assumed at the time the manual means is operated. It is necessary to lock this wiper or to hold it with respect to the movements of the directional gyro because when manual turns are effected by the operation of the manually operated means the directional gyro would attempt to stabilize the plane in a given direction. In other words, the directional gyro would oppose the action of the manually operated means.

If the manually operated means were operated to effect a manually controlled turn and also cause the locking of the wiper of the potentiometer in its existing position, it was found that after the manual control means was returned to unoperative position on completion of the turn that in cases where the wiper of the potentiometer was locked while displaced from its normal position lurching of the plane off the new course selected by operation of the manual means would result.

It is an object of this invention therefore to provide a manual means for changing the heading of an aircraft without resulting in a lurch of the aircraft off course after the aircraft has assumed a new heading as determined by the operation of the manual means. Such object is obtained by centering or moving to unoperated position the wiper of the potentiometer which had been moved by the directional gyro. This centering is done upon the operation of the manually operated means for effecting a turn of the aircraft.

A further object of this invention is to provide a centering means for the directional gyro operated wiper by means which normally does not oppose the movement of the directional gyro during the positioning of the wiper.

It is a further object of this invention therefore to provide means for centering a directional gyro operated wiper without causing a precessing torque to be applied to the directional gyro.

It is a further object of this invention to provide an improved clutch arrangement between the directional gyro and the wiper of a potentiometer which wiper is driven by the gyro through the clutch arrangement. The improved clutch arrangement prevents the application of any force tending to precess the gyro when the wiper operated by the gyro is held in inoperative position.

It is an object of this invention therefore to provide an improved clutch drive and recentering arrangement for the wiper of a potentiometer. This potentiometer is included in a network which controls the operation of a control surface for an aircraft. The improved centering arrangement for the wiper is so constructed that it does not apply any force to the gyroscope which moves the wiper.

It is a further object of this invention to provide a constant altitude control apparatus for an aircraft which constant altitude apparatus operates on the control surface of the aircraft and is provided with novel means for selecting any altitude at which it may be desired to fly the aircraft.

It is a further object of this invention to provide a constant airspeed apparatus for an aircraft in flight. This constant airspeed apparatus is arranged to operate a control surface of the aircraft in the maintenance of the desired airspeed, and such constant airspeed apparatus for an aircraft is provided with novel manually controlled means for selecting the airspeed at which it is desired that the aircraft will fly.

Other objects of this invention may be determined by reference to the detailed specification and drawings.

Figure 1:
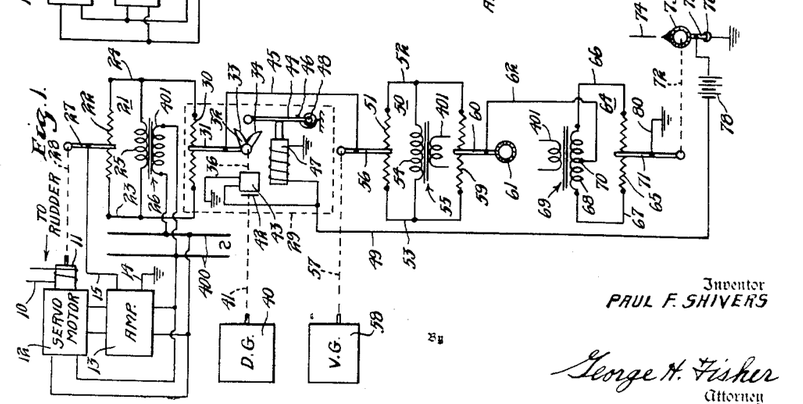
Figure 1 shows an improved apparatus for controlling the operation of the rudder of an aircraft.

Referring to Figure 1 of the drawing, a rudder (not shown) is operated by cables 10 affixed thereto. These cables 10 extend from a cable drum 11 which is driven by a servo motor 12. The servo motor 12 reversibly drives cable drum 11 and is itself controlled by an amplifier 13. The servo motor 12 and the amplifier 13 are connected to a source of alternating current 400 which may be the inverter of the aircraft (not shown). The amplifier 13 has input terminals 14 and 15. The direction of rotation of servo motor 12 as controlled by amplifier 13 depends upon the phase relationship between the voltage signal applied across the input terminals 14 and 15 and the voltage of the alternating current source 400. The amplifier servo motor arrangement may be similar to that disclosed in Patent 1,586,233 issued May 25, 1926 or as that disclosed in the patent to Whitman No. 1,942,587.

The input control signal for amplifier 13 which is applied across terminals 14 and 15 is derived from a circuit extending from terminal 15, lead 20, impedance network 21, lead 45, impedance network 50, lead 62, impedance network 64, lead 80 to ground, and to grounded terminal 14 of amplifier 13.

Impedance network 21 is in the form of a Wheatstone bridge. Two arms of this bridge are formed by a resistor 22 having one of its ends connected through a lead 23 to one end of a secondary winding 25 of a transformer 26 having a primary winding 401. The opposite end of the resistor 22 is connected through lead 24 to the opposite end of the secondary winding 25. Since in the several networks to be described the several secondary windings may have a single primary winding, the primary winding 401 will be considered common to the several networks. A wiper 27 may be moved along the surface of resistor 22. The wiper is moved by servo motor 12 through an operating connection 28. The input terminal 15 is connected by means of lead 20 to wiper 27. The opposite two arms of the bridge are formed by a resistor 30 having one end connected by lead 23 to one end of secondary winding 25. The other end of resistor 30 is connected by lead 24 to the other end of secondary winding 25. A wiper 31 may be moved along the surface of resistor 30. Lead 45 extends from wiper 31 to a following network. The voltage signal obtained from any relative displacement of wipers 27, 31 from the electrical centers of their respective resistors 22, 30 form the output of network 21.

The resistor 30 and the wiper 31 are contained within a unit 29 whose outline is indicated. The wiper 31 within the unit 29 is mounted on a cam 32. This cam 32 is rotatably carried by a spindle 36. The cam as shown has two operating surfaces. These operating surfaces of cam 32 consist of oppositely inclined sides 33, 34. These oppositely inclined sides extend outwardly from a common point toward the periphery of the cam. An arm 44 carries a roller which may engage the surface of the cam and the arm 44 is mounted on pivot 48. The arm 44 is acted upon by a torsion spring 46 which has one end connected to the pivot and the other end connected to the arm 44 to bias the roller into contact with the cam 32. An electromagnet 47 when energized has a plunger which engages arm 44 and tends to hold the roller of arm 44 away from contact with cam 32. When the electromagnet is deenergized the torsion spring 46 biases the roller into contact with cam 32 and tends to force the cam and therefore the wiper 31 to a normal position. The cam 32 and wiper 31 also derive a movement from a directional gyro 40 through a magnetic clutch 43.

The magnetic clutch 43 is contained within the unit 29. The magnetic clutch is mounted on spindle 36. For purposes of illustration the magnetic clutch has been rotated from a position towards the observer into the plane of the drawing. The directional gyro 40 may be of the type disclosed in application 447,989 filed June 22, 1942. An operating driving connection 41 extends from the directional gyro 40 and coacts with the magnetic clutch 43 for which purpose it carries a disk 42. The disk 42 constitutes a portion of the magnetic clutch 43 and serves to transmit movement from the directional gyro 40 through the magnetic clutch 43 to the cam 32 of unit 29. The magnetic clutch 43 and the electromagnet 47 of unit 29 are energized at the same time through a circuit having one side extending from lead 49 connected to the respective units 43 and 47 to a battery 78.

Impedance network 50 is in the form of a Wheatstone bridge. Two arms of this bridge are formed by a resistor 51 having one of its ends connected through lead 55 to one end of a secondary winding 54. The opposite end of the resistor 51 is connected by lead 52 to the remaining end of secondary winding 54. The secondary winding 54 is a portion of a transformer 55 having a primary winding 401. The wiper 56 may be moved along the surface of resistor 51. The wiper 56 receives its movement from a vertical gyroscope 58 by means of an operating connection 57 extending from the vertical gyro to the wiper. The vertical gyro 58 may be of the type disclosed in the aforesaid application. Lead 45 extending from network 21 is connected to wiper 56 of the network 50. The opposite two arms of the bridge are formed by a resistor 59 having one of its ends connected through lead 52 to one end of secondary winding 54 and having its remaining end connected through lead 53 to the other end of secondary winding 54. A wiper 60 may be moved along the surface of resistor 59. Wiper 60 may be moved by a manually operated knob 61 affixed to wiper 60. Lead 62 extends from wiper 60 to a following network 64. Any voltage across wipers 56, 60 constitutes the output of network 50.

Impedance network 64 comprises a potentiometer. This potentiometer has a resistor 65 having one end connected through lead 66 to one end of a secondary winding 68, the other end of the resistor 65 is connected through lead 67 to the opposite end of secondary winding 68. The secondary winding 68 forms a part of a transformer 69 having a primary winding 401. The secondary winding 68 has a center tap 70 connected to lead 62. A wiper 71 may be moved along the surface of resistor 55. Such movement of wiper 71 is derived from a turn control knob 73 through a mechanical connection 72. The wiper 71 is connected to lead 80 and to ground. The output of network 64 is obtained by the voltage between wiper 71 and center tap 70 arising out of the displacement of the wiper from the electrical center of resistor 65.

The turn control knob 73 has a pointer which coacts with an indicating line 74 to mark the extent of movements of the turn control means from normal position. The turn control knob 73 carries in an insulated relation thereto a switch member 75. This switch member 75 engages a terminal 76 in normal position of the turn control knob 73. The terminal 76 is grounded. The switch arm 75 is connected to one side of the battery 78.

The networks described are connected in a series arrangement. One end of the arrangement is connected to one input terminal of amplifier 13 and the other end of the series arrangement is connected to a second input terminal of amplifier 13. The algebraic sum of the voltage outputs of the several networks in series forms the input signal to the amplifier to control its operation.

Figure 2:
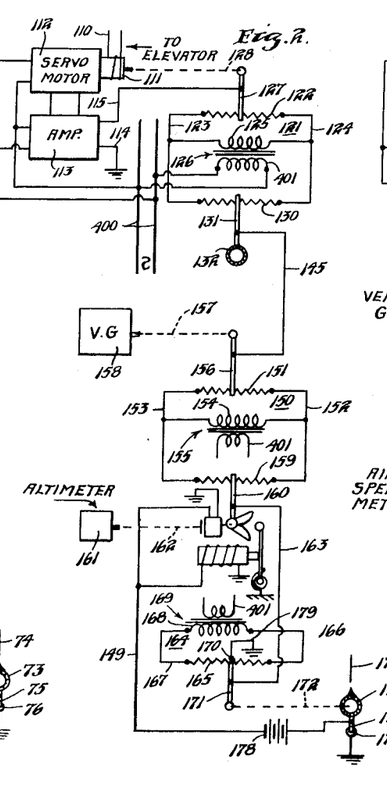
Figure 2 shows apparatus for maintaining an aircraft at a constant altitude while in flight.

Figure 2 shows an arrangement for controlling the operating means for the elevator whereby constant altitude of the aircraft may be obtained. In Figure 2, the elevators which are not shown are connected to cables 110 which extend from a cable drum 111. The cable drum is driven from a servo motor 112.

The servo motor 112 is reversibly controlled by an amplifier 113. The servo motor 112 and amplifier 113 are connected to a source of alternating current 400. The input to the amplifier 113 which controls the direction of rotation of servo motor 112 is applied across terminals 114 and 115. The direction of rotation of servo motor 112 depends upon the phase relationship between the voltage signal applied across terminals 114, 115 and the voltage of source 400.

The amplifier 113 is controlled through a circuit extending from terminal 115, lead 120, impedance network 121, lead 145, impedance network 150, lead 163, impedance network 164, lead 179, to ground and to the grounded terminal 114 of amplifier 113.

The impedance network 121 is in the form of a Wheatstone bridge. A resistor 122 forms two arms of this bridge. One end of resistor 122 is connected through lead 123 to one end of a secondary winding 125, the other end of resistor 122 is connected through leads 124 to the opposite end of secondary winding 125. The secondary winding 125 forms part of a transformer 126 having a primary winding 401. A wiper 127 may be moved along the surface of resistor 122. The wiper 127 derives its movement from servo motor 112 by means of an operating connection 128. Lead 120 extends from amplifier terminal 115 to wiper 127. The opposite two arms of the bridge are formed by a resistor 130 which has one of its ends connected through lead 123 to one end of secondary winding 125. The other end of resistor 130 is connected through the lead 124, to the opposite end of secondary winding 125. A wiper 131 may be moved along the surface of resistor 130 and receives such movement from a manually operable knob 132 affixed to wiper 131.

Wiper 127 is normally at the electrical center of resistor 122 and wiper 131 is at the electrical center of resistor 130. When so positioned there is no difference of potential between wipers 127 and 131. If wiper 131 be manually moved by knob 132 away from its electrical center a difference of potential will exist between wiper 127 and wiper 131. Such potential constitutes the output of network 121. To remove such difference of potential it will be necessary to adjust wiper 127. The adjustment of wiper 127 through the servo motor 112 also effects the operation of the elevators. The knob 132 which moves wiper 131 is considered the adjusting means for the elevator since by its adjustment it changes the normal position of the elevator. The manuallly operable knob 132 and wiper 131 are generally termed the centering means since they normally serve to position the elevator in central position. A lead 145 extends from wiper 131 to a following network 150.

The impedance network 150 is in the form of a Wheatstone bridge. Two arms of this bridge are formed by a resistor 151 which has one of its ends connected by means of lead 152 to one end of a secondary winding 154 of a transformer 155. The other end of resistor 151 is connected by means of lead 153 to the opposite ends of secondary winding 154. The transformer 155 has a primary winding 401. A wiper 156 may be moved along the surface of resistor 151. The wiper 156 is connected to lead 145. The wiper 156 derives its movement from a vertical gyro 158 through an operating connection 157. The vertical gyro 158 may be of the type disclosed in the aforesaid application. The wiper 156 is moved whenever there is any relative movement about the pitch axis of the aircraft between the aircraft and the flight gyro 158. The other two arms of the bridge are formed by a resistor 159 having one of its ends connected by means of lead 152 to one end of secondary 154 and having its opposite end connected by means of lead 153 to the opposite end of secondary winding 154. A wiper 160 may be moved along the surface of resistor 159.

In normal position, the wiper 156 is at the electrical center of resistor 151 and the wiper 160 is at the electrical center of resistor 159. When so positioned, there is no relative potential between the wipers 156 and 160 and no output from network 150.

A lead 163 extends from wiper 160 to a following network 170. The resistor 159 and wiper 160 are contained within a unit similar to unit 29 of the rudder control network. The wiper 160 receives its movement from an altimeter 161 through a magnetic clutch similar to that described in the rudder control channel.

The altimeter 161 may be similar to that disclosed in the Roesch Patent 1,351,130 issued August 31, 1920. In the patent a shaft 26 is positioned in accordance with changes in altitude. This shaft 26 of the patent may operate the driving connection 162 extending from the altimeter 161 to the magnetic clutch which drives the wiper 160. The wiper 160 is mounted on a cam similar to the cam 32 in the rudder control channel. The cam is provided with a follower which may serve to place the wiper 160 in a normal position. The clutch means for adjusting wiper 160 has a means for centering or placing the wiper 160 in a normal position similar to the elements of unit 29 and a detailed description thereof is omitted. However, reference may be had to unit 29 of the rudder channel for a detailed description thereof.

The impedance network 164 comprises a potentiometer having a resistor 165 which has one end connected through a lead 166 to one end of a secondary winding 168 and which resistor has its opposite ends connected through a lead 167 to the opposite end of secondary winding 168. The secondary winding 168 is a part of a transformer 169 having a primary winding 401. The resistor 165 has its center tap 170 connected by means of lead 179 to ground. A wiper 171 may be positioned along the surface of resistor 165. When thus positioned, any voltage between wiper 171 and center tap 170 constitutes the output of the network 164. The wiper 171 derives its movement from a manually operated knob 173 through a mechanical connection 172. The manual control knob 173 has a pointer which coacts with an indicating line 174 to show variation from normal position. The indicating line 174 and the pointer 173 may coact in the selection of the altitude at which the plane is to fly. The manual knob 173 carries in an insulated relation a contact arm 175. This contact arm 175 in normal position engages a terminal 176. The terminal 176 is grounded. The contact arm 175 is connected to one side of a battery 178. The opposite side of the battery 178 is connected through lead 149 to the magnetic clutch and the electromagnet contained within the transmitting and centering device for wiper 160.

The series arrangement of the networks being connected to amplifier 113 control its operation.

Figure 3:
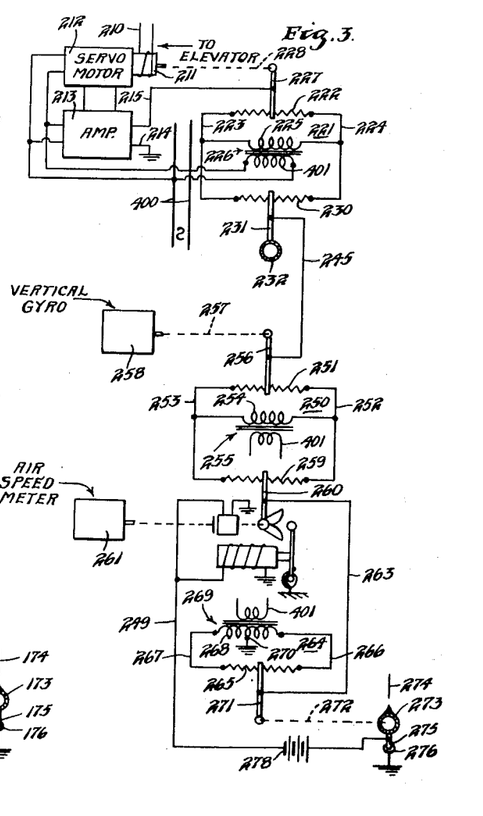
Figure 3 shows apparatus for maintaining a constant speed for an aircraft in flight.

Figure 3 shows an arrangement for maintaining an airplane at a constant air speed. In this arrangement an elevator (not shown) is operatively connected to cables 210 which extend from a servo motor drum 211. The drum 211 is connected to a servo motor 212. The servo motor 212 is reversibly controlled by an amplifier 213. The amplifier 213 and servo motor 212 are connected to a common source of alternating current 400. The amplifier 213 is provided with input terminals 214 and 215. The direction of rotation of servo motor 212 depends upon the phase relationship between the signal voltage applied across the input terminals 214 and 215 and the source of voltage 400.

The servo motor and amplifier arrangement 212 and 213 of the constant air speed arrangement like the servo motor 112 and amplifier 113 of the constant altitude arrangement is similar to the servo motor 12 and amplifier 13 arrangement of Figure 1.

The signal input circuit for amplifier 213 extends from terminal 215, lead 220, impedance network 221, lead 245, impedance network 250, lead 263, impedance network 264, center tap 270 to ground, and to the grounded terminal 214 of amplifier 213.

The impedance network 221 is in the form of a Wheatstone bridge. Two arms of the bridge are formed by a resistor 222 having one end connected by means of lead 223 to one end of a secondary winding 225 of a transformer 226; the other end of the resistor 222 is connected through lead 224 to the opposite end of secondary winding 225. A wiper 227 may be moved along the surface of resistor 222. The wiper 227 receives its movement from servo motor 212 through an operating connection 228. A lead 220 extends from wiper 227 to terminal 215 of amplifier 213. The opposite two arms of the bridge are formed by a resistor 230 which has one of its ends connected through lead 224 to one end of secondary winding 225 and has its opposite end connected through lead 223 to the other end of secondary 225. A wiper 231 may be positioned along the surface of resistor 230. Wiper 231 is connected to a manually operable knob 232 whereby it may be moved. In normal position the wipers 227 and 231 are at the electrical center of their respective resistors 222 and 230. When in such position there is no difference of potential between wipers 227 and 231 and no output from network 121. The wiper 231 and its manually operable knob 232 are similar to the wiper 131 and knob 132 is of the constant altitude control means. The manually operable knob 232 may therefore serve as the centering means for the elevator in the constant airspeed control device. A lead 245 extends from wiper 231 to a following network 250.

The impedance network 250 is in the form of a Wheatstone bridge. Two arms of this bridge are formed by a resistor 251 which has one of its ends connected by means of a lead 252 to one end of a secondary winding 254. The other end of resistor 251 is connected to lead 253 to the opposite end of secondary winding 254. The secondary 254 is part of a transformer 255 having a primary winding 401. The opposite two arms of the bridge are formed by a resistor 259 which has one of its ends connected through lead 252 to one end of a secondary winding 254 and has its opposite end connected through lead 253 to the opposite end of secondary winding 254. A wiper 256 contacts the surface of resistor 251. The wiper 256 derives its movement from a vertical gyro 258 through an operating connection 257. The vertical gyro 258 is similar to vertical gyro 158. The lead 245 from network 221 extends to wiper 256. A wiper 260 may be moved along the surface of resistor 259. Any potential between wipers 256, 260 constitutes the output signal voltage from network 250.

The wiper 260 is provided with a driving arrangement and a resetting arrangement similar to that described in unit 29 which is positioned between the directional gyro 40 and the wiper 31 in the rudder control channel. A reference may be made to the unit 29 for a detailed description of the driving and resetting means for wiper 260. The magnetic clutch which drives the wiper 260 receives its movement from an airspeed meter 261.

The airspeed meter 261 may be of the type disclosed in the patent to Bristol 1,240,790 issued September 18, 1917. In Figure 3 of the patent a pinion 25 on a shaft 13 is moved in accordance with changes in airspeed. This shaft 13 may operate the magnetic clutch in the constant airspeed channel of Figure 3.

The wiper 260 is connected by means of a lead 263 to a following network 264. The network 264 comprises a potentiometer. The resistor 265 of this potentiometer has one of its ends connected by means of lead 266 to one end of a secondary winding 268. The other end of resistor 265 is connected through lead 267 to the opposite end of secondary winding 268. The secondary winding 268 has a center tap 270 connected to ground. The winding 268 is a part of a transformer 269 having a primary winding 401. A wiper 271 may be moved along the surface of resistor 265.

The wiper 271 has an operative connection 272 extending to a manually operable knob 273. The manually operable knob 273 has a pointer which coacts with indicating line 274. The pointer 273 and the line 274 provide indicating means whereby any desired speed by which the plane is to fly may be selected.

The manually operable knob 273 carries in insulated relation thereto a contact arm 275. In the normal position of the knob 273 the arm 275 engages a grounded terminal 276. The arm 275 is connected to a battery 278. The other side of the battery 278 is connected to the magnetic clutch and the electromagnet following part of the resetting means and the driving means for wiper 260.

In normal position the wiper 271 is at the electrical center of resistor 265 therefore wiper 271 and the center tap 270 are at the same potential. The manually operable knob 273 may be operated to adjust wiper 271 to set up a voltage across center tap 270 and wiper 271 which form the output voltage of network 264.

Operation

The operation of the rudder control networks and associated elements, illustrated in Figure 1 will be considered. Normally operation of the aircraft is manually controlled by the conventional "stick" and rudder pedals to select a desired heading which the plane is to maintain. When such heading is attained the autopilot is "clutched in" by means disclosed in application 447,989 and the directional gyro 40 becomes operative to automatically maintain the aircraft on the desired course or heading. If the aircraft deviates from the desired heading the directional gyro 40 will displace the wiper 31 through the driving connection 41 and magnetic clutch 43. Movement of the wiper 31 by means of the directional gyro 40 causes a displacement of wiper 31 with respect to the electrical center of resistor 30. A voltage therefore exists between wiper 27 and wiper 31. This voltage is applied on the one hand through lead 20 extending from wiper 27 to the input terminal 15 of amplifier 13. The wiper 31 is connected through lead 45 and network 50, lead 62, impedance network 64, lead 80 to ground and to the grounded terminal 14 of amplifier 13. This signal voltage applied to the amplifier 13 effects its operation to thereby cause the motor 12 to position the rudder. At the same time the servo motor 12 through the operating connection 28 which forms the follow up means positions the wiper 27 so that no potential difference exists between wiper 27 and wiper 31. When no difference of potential exists the amplifier 13 no longer operates and the servo motor 12 remains in the position that it assumed. The aircraft proceeds under the effect of the applied rudder to assume the desired heading. As the aircraft approaches the desired heading the directional gyro 40 signal decreases and moves the wiper 31 in the opposite direction from that orignally given to the wiper 31 or toward the electrical center of resistor 30. This new adjustment of wiper 31 sets up a difference of potential between wiper 27 and wiper 31 which is of opposite phase from that potential originally set up. Ths opposite difference of potential causes the amplifier 13 to effect reverse rotation of servo motor 12 and the rudder is moved toward center position. The servo motor 12 also through the follow up means 28 positions wiper 27 to assume such position that no potential difference between wiper 27 and wiper 31 exists. The acton is continuous and when the aircraft has assumed the desired heading with wiper 31 centered the servo motor has adjusted wiper 27 to the electrical center of resistor 22 and has moved the rudder to normal or unoperated position. By the above arrangement the heading of the aircraft is maintained or stabilized in a desired direction.

It may be desired to change the stabilized heading of the aircraft while the aircraft is turning as above described without declutching the autopilot. The change of heading may be effected by the operation of the turn control knob 73 in the direction a turn is desired and which operation displaces contact arm 75 with respect to the grounded terminal 76. When contact arm 75 is moved from terminal 76 the circuit to the electromagnetic clutch 43 and the electromagnet 47 is open. Opening of the circuit to magnetic clutch 43 isolates the directional gyro 40 from the wiper 31; at the same time torsion spring 46 biases the roller on arm 44 into engagement with one or the other surfaces 33, 34 of cam 32. The cam 32 is thereby forced to its original position and carries wiper 31 with it so that wiper 31 is positioned at the electrical center of resistor 30. It is necessary to isolate the directional gyro 40 in order that it may not oppose a change of heading of the aircraft.

The operation of the turn control knob 73 through the operating connection 72 adjusts wiper 71 with respect to the electrical center of resistor 65. Such adjustment sets up a difference of potential between center tap 30 of secondary winding 68 and the wiper 71. This difference of potential is applied to the amplifier 13 which in turn effects the operation of the servo motor 12. The servo motor 12 positions the rudder through cable 10 depending on the amount of movement of turn control knob 73. The servo motor 12 also through the follow up means 28 adjusts wiper 27 with respect to the electrical center of resistor 22. The movement of wiper 27 at this time is in such a direction as to set up a potential between wiper 27 and wiper 31 equal and opposite to that existing between wiper 71 and center tap 70. When such a potential is set up, the amplifier 13 no longer operates and the servo motor 12 remains in the position which it has assumed. The aircraft flies under the amount of rudder applied until it approaches the desired heading. When the desired heading is approached, the pilot moves the manually operable turn control knob 73 toward normal position. This moves the wiper 71 toward the electrical center of resistor 65 and a difference of potential in the rudder control network is thereby set up since the difference of potential between wiper 70 and wiper 71 is less than that between wiper 27 and wiper 31. The amplifier 13 thereby operates and causes the servo motor coil to move in the reverse direction from that which it originally assumed and causes the positioning of wiper 27 in the opposite direction to set up a potental between wiper 27 and wiper 31 equal and opposite to that between center tap 70 and wiper 71. When the turn control knob 73 has been moved back into normal position the amplifier 13 through servo motor 12 has positioned wiper 27 into normal position and has also caused the positioning of the rudder back into normal position. The plane may now continue on the heading selected by the operation of the turn control knob 73.

It may be observed that the magnetic clutch 43 by disassociating the directional gyro 40 from the wiper 31 permits the movement of wiper 31 back to normal position without applying any torque to the gyro 40 which might unnecessarily cause the precession of the rotor of the directional gyro 40 from its desired horizontal position. It also may be observed that the resetting means which comprised the spring biased arm 40 with its roller and the cam 32 are themselves disassociated during the time the directional gyro adjusts the wiper 31 while the aircraft is stabilized on a desired heading. Such disassociation between the cam 32 and the roller on arm 44 is desirable since no force is transmitted to the directional gyro 40 which might unnecessarily cause the precession of its rotor away from horizontal.

The return of wiper 31 upon operation of the manually operable means 73 to initiate a manually controlled turn is of utmost importance. In the device of the aforesaid application the wiper 31 was locked in the position which it had assumed at the time that the turn control knob 73 was operated. If this wiper 31 had been displaced from its normal position and was locked therein upon operation of turn control knob 73, it was found that after the plane assumed a new desired heading that the rudder control network was unbalanced and a heavy signal would be applied to the servo motor 12 causing a large movement of the rudder which causes the plane to lurch off of the new heading by providing the centering means for wiper 31, which is effective upon the operation of the turn control knob 73 this lurch is prevented.

In the device of the aforesaid application the wiper operated from the directional gyro was locked upon the operation of the turn control means. The locking of the wiper caused a force to be applied to the directional gyro because the directional gyro was associated with the wiper through a friction clutch. In the friction clutch arrangement one side of the friction clutch was locked and therefore a friction would be applied to the directional gyro which friction caused the rotor of the directional gyro to be unnecessarily precessed. By providing a clutch 23 which disassociates the directional gyro from the wiper 31 unnecessary precession is avoided. Therefore by providing a novel clutch arrangement between the directional gyro 40 and the wiper 31 and further by providing an automatic recentering arrangement for the wiper 31 upon operation of a manually turn control knob, we have avoided unnecessary precession of the directional gyro and unnecessary lurching of the plane upon completion of a manually initiated turn.

*Operation of the constant altitude control*

In the operation of the constant altitude arrangement of Figure 2 the aircraft is manually controlled until a desired altitude is attained by the aircraft. Upon attaining such altitude the autopilot is clutched in and the altimeter 161 stabilizes the aircraft at the desired altitude. If the aircraft has been flying for a considerable period of time, the consumption of the gasoline carried by the aircraft would decrease the load of the aircraft and would tend to cause the aircraft to increase its altitude. Upon any increase in altitude the altimeter 161 would position the wiper 160 of network 150. This would set up a difference of potential between wiper 160 and wiper 156. This potential will be applied on the one hand from wiper 156, lead 145, network 121, lead 120 to input terminal 115 of amplifier 13 and on the other hand will be applied from wiper 116, lead 163, network 164, lead 179 to ground and to grounded terminal 114 of amplifier 113. The signal applied across terminals 114 and 115 would cause the operation of amplifier 113. The amplifier 113 would therefore effect the rotation of servo motor 112 to apply elevator. In this case the servo motor would apply down elevator to correct for the increase in the altitude of the aircraft. The application of the down elevator tilts the plane about its pitch axis. The verical flight gyro 158 senses the rotation of the aircraft about its pitch axis and moves wiper 156. In the original operation of servo motor 112 it positioned wiper 127 with respect to the center tap of resistor 122 to set up a voltage between wiper 127 and wiper 131 equal and opposite to that existing between wipers 160 and 156. At that time the servo motor 112 had stopped operation. When the vertical flight gyro 158 moves wiper 156, upon movement of the aircraft about its pitch axis, it decreases the potential between wiper 156 and wiper 160. The potential therefore between wiper 156 and wiper 160 is less than that between wiper 127 and wiper 131; consequently the servo motor is moved in the opposite direction. The operation of the servo motor 112 at this time centers the elevator and also positions wiper 127 so that no difference of potential between wiper 127 and wiper 131 is in excess of the difference of potential between wiper 156 and wiper 160.

It is well known that when an aircraft in flight is moved about its pitch axis as a result of the movement of the elevator and thereafter the elevators are centered the aircraft will maintain the angle which it had assumed by the movement of the elevator in the first instance. Therefore, the aircraft maintains a downward path as the result of the operation of the elevators even though they are centered at the present time. As the aircraft approaches the desired altitude the altimeter 161 moves the wiper 160 back toward normal position. The voltage between wiper 156 and wiper 160 is of opposite phase from that originally set up and consequently the unbalanced bridge network for the elevator causes the amplifier 113 to become operative. The amplifier 113 causes a servo motor 112 to apply up elevator since the control is in the opposite direction. The servo motor 112 also adjusts the wiper 127 to balance the network for controlling the amplifier 113. The action is continuous and when the desired altitude is attained the altimeter 161 has moved wiper 160 back to the center of resistor 159, the gyro has moved wiper 156 back to its center and the servo motor 112 has moved the elevators back to central position and has also adjusted wiper 127 back to the electrical center of resistor 122. By this arrangement the aircraft is stabilized at a constant altitude.

If it be desired to change the altitude at which the plane is flying the manually operable knob 173 may be turned. Turning knob 173 removes contact arm 175 from grounded terminal 176 and opens the circuit to the magnetic clutch between the altimeter and the wiper 160 and also opens the circuit for the electromagnet controlling the recentering means for the cam on which wiper 160 is mounted. The opening of the magnetic clutch circuit isolates the altimeter from the wiper 160. The opening of the electromagnet permits the torsion spring to force the roller into engagement with the surfaces of the cam on which wiper 160 is mounted to move the wiper 160 back to the electrical center of resistor 159. The movement of control knob 173 through the operating connection 172 displaces wiper 171 with respect to center tap 170 of resistor 165. Thus a voltage between wiper 171 and center tap 170 exists at this time. This voltage is applied to the amplifier 113 to cause the operation of servo motor 112. The servo motor 112 moves the elevator either in a downward or upward position depending upon whether an increase or decrease in altitude is desired. The servo motor 112 also positions wiper 127 with respect to the electrical center of resistor 122. Movement of wiper 127 sets up a difference of potential between wiper 127 and 131 equal and opposite to that difference of potential between center tap 170 and wiper 171. The equal and opposite differences of potential balances the network and causes the amplifier 113 to cease operation with a consequent stopping of servo motor 112 in the position it had assumed.

The vertical flight gyro 158 responds to the tilting of the aircraft about the pitch axis as the result of the operation of the elevators. The vertical flight gyro moves the wiper 156 to decrease the voltage between wiper 156 and wiper 160. The movement of wiper 156 unbalances the network for controlling amplifier 113 in the opposite direction and again causes the operation of servo motor 112 which moves the elevators back toward center position. It also causes the movement of wiper 127 toward normal position.

As the plane approaches the desired altitude the control knob 173 is moved back toward normal position. The movement of the control knob 173 moves wiper 171 back to a normal position and unbalances the network for controlling amplifier 113. The amplifier 113 operates and causes the servo motor 112 to position the elevator in opposite direction from that assumed in the original operation of the control device 173. The servo motor 112 also moves wiper 127 to balance the network. The action is continuous and as the turn control knob 173 is moved to a center position the gyro 158 moves wiper 156 to its center and the servo motor 112 moves the wiper 127 back to its normal position and also moves the elevator back to center.

When the turn control knob is in normal position the circuit to the magnetic clutch is completed as is also the circuit to the electromagnet for holding the recentering means for wiper 160 out of engagement. The altimeter now assumes automatic constant altitude control for the aircraft and effects stabilization of the aircraft at the desired or newly selected altitude.

*Operation of the constant airspeed apparatus of an aircraft*

In the operation of the constant airspeed apparatus for the aircraft, the plane is manually controlled in its transition from the ground into the air. When the aircraft has reached a desired position in the air the pilot sets the throttles for the engine at the desired speed of the aircraft. The automatic control for maintaining the airspeed is then clutched in.

As long as the aircraft maintains the desired speed no movement will be applied to wiper 260 from the airspeed meter 261. When any changes of the aircraft speed occur the airspeed meter 261 will position wiper 260 along the resistor 259. The movement of the wiper 260 causes a difference of potential to arise between wiper 260 and wiper 256. This voltage unbalances the network for controlling amplifier 213. Amplifier 213 responds to the unbalanced voltage and effects the operation of servo motor 212. Servo motor 212 positions the elevator either up or down depending upon the direction in which airspeed has been changed. If the airspeed has increased the servo motor 212 will apply up elevator. The servo motor 212 will also through the operating connection 228 move the wiper 227. The movement of wiper 227 is in such a direction as to set up a voltage between wiper 227 and wiper 231 equal and opposite to the voltage existing between wiper 260 and wiper 256. The wiper as positioned by the servo motor 212 therefore balances the control network for the amplifier 213. Amplifier 213 therefore ceases to operate and servo motor 212 remains in its assumed position.

The movement of the aircraft about its pitch axis, as the result of the operation of the elevator by servo motor 212, causes the vertical gyroscope 258 to respond to the movement about the pitch axis. The gyro 258 positions wiper 256. The movement of wiper 256 unbalances the elevator control network and again causes the operation of amplifier 213 which effects rotation of servo motor 212 in the opposite direction from that which it originally assumed. The servo motor 212 moves the elevator back toward central position and at the same time the servo motor 212 adjusts wiper 227 to again balance the elevator control network.

As the aircraft decreases its speed and approaches the desired air speed, the air speed meter 261 moves wiper 260 back toward the central position of the wiper. This movement of wiper 260 unbalances the elevator control network and causes the operation of the servo motor 212. The direction of rotation of servo motor 212 is such as to apply down elevator to the aircraft. At the same time the servo motor 212 again positions wiper 227 to balance the network. As the aircraft moves under the effect of the down elevator to assume a level off position the vertical gyro 258 responds to the decrease in pitch angle of the plane and again moves wiper 256 to unbalance the elevator control network. The amplifier 213 again operates to cause the servo motor 212 to move the elevator toward neutral position and to move the wiper 227 to again balance the elevator control network. The action is continuous, the airspeed meter applying a signal to cause the application of down elevator to level the plane off, and the vertical gyro responds to the decrease in the attitude of the plane with respect to the pitch axis to cause the servo motor 212 to move the elevator back towards center position. At the time aircraft is leveled off the airspeed meter has moved wiper 260 to the center position on resistor 259, the vertical gyro 258 has moved wiper 256 back to the electrical center of resistor 251, and the servo motor 212 has centered the elevator and has centered wiper 227 with respect to resistor 222.

When it is desired that the plane fly at a different airspeed from that originally selected, the control knob 273 may be displaced from its normal position. Such displacement of knob 273 opens the circuit to the magnetic clutch which connects the airspeed meter 261 with the wiper 260. A circuit is also opened between the battery 278 and the electromagnet which controls the centering means for the wiper 260. It may be observed that the operation of the knob 273 also causes the adjustment of wiper 271. The movement of wiper 271 sets up a difference of potential between wiper 271 and center tap 270. This difference of potential upsets the balance of the network for controlling amplifier 213. The amplifier 213 thereupon operates and causes servo motor 212 to position the elevator and also to position the wiper 227 to set up a voltage between wiper 227 and wiper 231 equal and opposite to the voltage between wiper 271 and center tap 270.

The aircraft responds to the change in the position of the elevator and moves about its pitch axis. The vertical flight gyro 258 responds to any movement of the aircraft about its pitch axis and displaces wiper 256. Such movement of wiper 256 sets up a voltage between wiper 256 and wiper 260 as to unbalance the control network for amplifier 213. Amplifier 213 again operates to cause the servo motor 212 to move the elevator back to center position and also to move wiper 227 to set up a voltage between wiper 227 and wiper 231 which balances the network. At the balance point the amplifier no longer operates and the servo motor 212 remains in the position which it has assumed.

As the aircraft approaches the desired speed the pilot turns the knob 273 back to neutral or normal position. The movement of the knob 273 moves the wiper 271 back toward normal position and again unbalances the elevator control network. The amplifier 213 thereupon operates and causes the servo motor to move the elevator in an opposite position from that to which the elevator had been originally positioned. In other words, if up elevator had been applied, the servo motor 212 would now apply down elevator. The vertical gyro 258 responds to the change in the position of the aircraft about the pitch axis and moves the wiper 256. The wiper 256 as a result of this movement upsets the balance of elevator control network and amplifier 213 causes the motor 212 to move the elevator back toward center position. The action is continuous with the movement of the knob 273 back toward normal position. When the knob is in central or normal position the wiper 271 is in the center of resistor 265, the vertical flight gyro 257 has moved wiper 256 back to the electrical center of resistor 251, and the servo motor 212 has moved the elevator into central position and the wiper 227 in the center position of resistor 222.

With the knob 273 in center position the magnetic clutch between the airspeed meter 261 and wiper 260 is energized to affect a driving relationship between the meter 261 and the wiper at the same time the electromagnet for operating the centering arm for the wiper 260 is energized to move the roller away from the cam.

It should be noted that the knob 273 may be operated to select a different airspeed without waiting for the aircraft to be stabilized at a particular speed. In other words, if wiper 260 has been displaced from the center of resistor 259 the operation of the knob 273 would affect the centering of the wiper 260.

When the new speed has been selected the wiper 260 is moved in respect to its center by airspeed meter 261 to control the network and maintain the desired airspeed.

Having described novel flight control apparatus incorporating the novel transmitting and recentering arrangement for the wiper of a potentiometer, I claim as my invention:

1. A reversibly operable member having two oppositely inclined cam surfaces supported thereon, follower means for said cam surfaces, means for operatively displacing said member from a normal position including a clutch, declutching means for rendering said clutch ineffective to operate said member from said displacing means, and means for forcing said follower against said cam surfaces whereby said member is returned to normal position.

2. Flight control apparatus for an aircraft having a control surface, said apparatus comprising: operating means for said control surface, control means for said operating means including a member having oppositely inclined cam surfaces, follower means for said cam surfaces, means responsive to movement of the aircraft about an axis including a clutch means for operating said control means, means for rendering said clutch means ineffective to operate said control means from said responsive means, and means for operating said follower means whereby said control means may be placed in unoperated position.

3. Flight control apparatus for an aircraft having a control surface, said apparatus comprising: operating means for said control surface, control means for said operating means including a member having cam surfaces, follower means for said cam means, means responsive to movements of the aircraft about an axis, transmission means between said responsive means and said control means, means for rendering said transmission means ineffective with respect to said control means, means for operating said follower means, said follower means being normally disengaged from said cam means, and additional means for operating said control means.

4. Flight control apparatus for an aircraft having a control surface, said apparatus comprising: operating motor means for operating said control surface, control means for said motor means including means movable from a normal position, means responsive to a condition of said aircraft while in flight, clutch means for operating said movable means from said condition responsive means, manually operable means, means controlled by said manually operable means for disconnecting said clutch and for placing said movable means in normal position upon operation of said manual means, and means connecting said manually operable means with said control means whereby said condition may be manually controlled.

5. Flight control apparatus for an aircraft having a control surface, said apparatus comprising: operating means for said control surface, control means for said operating means including a network potentiometer, means responsive to the movement of the aircraft about an axis including a rotatable shaft, a magnetic clutch disk mounted on said shaft, a spindle coaxial with said shaft, a magnetic clutch rotatably mounted on said spindle, a cam on said spindle having outwardly and oppositely inclined portions extending from a common point, a pivotally mounted lever having a follower engaging said cam means, means for biasing said follower into contact with said cam, an electromagnet between said magnetic clutch and said pivot having a plunger for holding said roller out of contact with said cam, a potentiometer wiper on said cam and positioned on the opposite side of said spindle from said electromagnet, means having one position for energizing said magnetic clutch and said electromagnet whereby said responsive means may move said wiper of said potentiometer and having another position wherein said magnetic clutch and said electromagnet are deenergized whereby said biasing means acting on the follower effects return of the cam to original position.

6. In a flight control system for an aircraft having a control surface, means responsive to the movement of the aircraft about an axis, control means, a clutch between said responsive means and said control means whereby said control means is operated by said responsive means, operating means for said control surface responsive to operation of said control means, spring means operative while said clutch is disengaged for returning said control means to unoperated position, means for operating said clutch to permit operation of said control means by said responsive means, means for disengaging said clutch for isolating said responsive means from said control means, means for making said spring means ineffective while said clutch is operated, and means for operatively connecting said control means with said spring return means when the clutch is unoperated to return the control means to unoperated position.

7. Flight control apparatus for an aircraft having a control surface comprising, operating means for said control surface, control means for said operating means, means responsive to movement of an aircraft about an axis, disconnectible transmission means between said responsive means and said control means, movable means included in said control means and displaced through said transmission means from unoperated position by movement of said responsive means, energy storing biasing means for restoring said movable means to unoperated position, means for rendering said biasing means ineffective on said movable means and for connecting said transmission means, and means for disengaging said transmission means and rendering effective said biasing means with respect to said movable means.

8. Flight control apparatus for an aircraft having a control surface, said apparatus comprising: actuating means for said control surface, control means for operating said actuating means including a first control device movable from a normal position for causing said control means to operate said actuating means, yieldable means for returning said control device to normal position, means responsive to movement of the aircraft about an axis including disconnectible transmission means for moving said first control device, further means for connecting said transmission means and rendering said yieldable means ineffective, manually operable means connected with a second control device in said control means and with said further means whereby operation of said manual means disconnects said transmission means, returns said first control device to normal position, and operates said second control device.

9. Control means for operating a control surface of an aircraft for automatically maintaining a predetermined condition of flight of said aircraft comprising a signal generator movable from a normal null position for developing a signal, stabilizing means responsive to changes in said aircraft from said predetermined condition, means for drivably connecting said responsive means to said signal generator and for disconnecting the responsive means from the signal generator, yieldable means effective when said condition responsive means is disconnected from said signal generator for urging said generator to its null position, and means for rendering said yieldable means ineffective when said condition responsive means is drivably connected with said signal generator.

10. A controller for operating a control surface of an aircraft for automatically maintaining a predetermined condition of flight of said aircraft comprising a movable signal generator for developing a signal for actuating the control surface when the craft departs from a predetermined condition, means normally centering said generator in a nonsignal generating position, means responsive to changes in condition of said craft for actuating said signal generator from said no signal generating position, and means operatively connecting said condition responsive means to said generator and making said centering means ineffective on said generator.

11. A controller for operating a control surface of an aircraft for automatically maintaining the flight of said craft on a predetermined heading comprising a movable signal generator for developing a signal, means normally yieldably urging said generator to a nonsignal generating position, means responsive to change in heading of said aircraft for actuating said signal generator from said nonsignal generating position, means for drivably connecting said heading responsive means to said signal generator and for disconnecting the heading responsive means from the generator, and means for operating said last named means and for making said yieldable means ineffective when the heading responsive means is connected to said signal generator.

12. A flight controller for operating a control surface of an aircraft for automatically maintaining a predetermined condition of craft flight comprising a movable signal generator for developing a signal for actuating said surface when the craft flight departs from the predetermined condition, means normally yieldably urging said generator to a non-signal generating position, means responsive to change in the condition of craft flight for actuating said signal generator from said non-signal generating position, means for drivably connecting said condition responsive means to said signal generator and for disconnecting the condition responsive means from the generator, and means for operating said last-named means and for making said yieldable means ineffective when the condition responsive means is connected to said signal generator.

13. A flight controller for operating a control surface of an aircraft for automatically maintaining the craft flight in a predetermined condition comprising a signal generator movable from a normally null position for developing a signal for actuating said surface when craft flight departs from said predetermined condition, means responsive to changes in condition of said craft due to changes in craft flight for actuating said signal generator from said null position, means for drivably connecting said condition responsive means to said signal generator and for disconnecting the condition responsive means from the generator, and yieldable means associated with said last-named means and effective when said condition responsive means is disconnected from said generator for urging said generator to its null position, the action of said yieldable means being ineffective on said generator when the latter is drivably connected to said condition responsive means.

14. A flight controller for operating a control surface of an aircraft for automatically maintaining craft flight in a predetermined condition comprising a movable signal generator for developing a signal for actuating the surface when the craft departs from the predetermined condition, means normally centering said generator in a non-signal generating position, means responsive to change in condition of craft flight for actuating said signal generator from said non-signal generating position, and means operatively connecting said condition responsive means to said generator and making said centering means ineffective on said generator.

15. A flight controller for operating a control surface of an aircraft for automatically maintaining a predetermined condition of craft flight comprising a movable signal generator for developing a signal for actuating said surface when the craft flight departs from the predetermined condition, centering means including yieldable means engageable with said signal generator and urging said signal generator to non-signal generating position, further means for disengaging said yieldable means from said signal generator, means responsive to change in the condition of the craft flight for actuating said signal generator from said non-signal generating position, means for drivably connecting said condition responsive means to said signal generator and for disconnecting the condition responsive means from the generator, and means for operating said last named means to drivably connect said condition responsive means to said signal generator and for also operating said further means for disengaging said yieldable means from said signal generator and thus making said yieldable means ineffective when the condition responsive means is connected to said signal generator.

16. A flight controller for operating a control surface of an aircraft for automatically maintaining craft flight in a predetermined condition comprising: means including a movable signal generator for developing a signal for actuating the surface; centering means including yieldable means engageable with said signal generator for urging said generator to nonsignal generating position and motive means for disengaging said yieldable means from said signal generator; means responsive to change in condition of craft flight; means for drivably connecting said condition responsive means to said signal generator and for disconnecting the condition responsive means from the generator; and means for operating said last named means to drivably connect said condition responsive means to said signal generator and for also operating said motive means for disengaging said yieldable means from the signal generator while the condition responsive means is connected to said signal generator.

17. Flight control apparatus for an aircraft having a control surface, said apparatus comprising: motor means for operating said control surface, control means for said motor means including means movable from a normal position, means responsive to a condition of said aircraft while in flight, clutch means having a driving and driven member for operating said movable means from said condition responsive means said driven member having a path of operation, manually operable means, means controlled by said manually operable means upon operation thereof for disconnecting said driven from said driving member of said clutch; centering means including yieldable means adapted for movement into and away from the path of operation of said driven member and thus for connection and disconnection with said driven member, further means for moving said yieldable means away from the path of operation, means to render said further means ineffective upon operation of said manual means; and additional means connecting said manually operable means with said control means whereby said condition means may be manually controlled.

18. In control apparatus for operating a control surface of an aircraft for automatically maintaining a predetermined condition of flight of said aircraft comprising: a signal generator movable from a normal null position for developing a signal, stabilizing means responsive to change in said aircraft from said predetermined condition, means for drivably connecting said responsive means to said signal generator and for disconnecting the responsive means from the signal generator, yieldable means connected to said condition responsive means when the same is disconnected from said signal generator for urging said signal generator to its null position, and means for disconnecting said yieldable means from said signal generator when the condition responsive means is drivably connected with said signal generator.

19. A flight controller for operating a control surface of an aircraft for automatically maintaining a predetermined condition of craft flight comprising: a movable signal generator for developing a signal for actuating said surface when the craft flight departs from the predetermined condition, centering means including yieldable means engageable with said signal generator and urging said signal generator to non-signal generating position, motive means associated with said yieldable means and operable when rendered effective to move said yieldable means to a position in which said yieldable means is disengaged from said signal generator throughout the normal range of movement of said generator, means responsive to change in the condition of craft flight for actuating said signal generator from said non-signal generating position, means including a clutch for releasably connecting said condition responsive means in driving relation to said signal generator, and means for simultaneously causing engagement of said clutch and operation of said motive means to move said yieldable means to said position in which it is disengaged from said signal generator so that said condition responsive means is unaffected by said yieldable means.

20. In an aircraft automatic pilot having a rudder servomotor and course change responsive means connected to said servomotor for controlling the motor, course change responsive means, a displaceable signal generator, motion transmission interconnecting said course change responsive means and signal generator, actuating means normally disassociated from said generator but capable of being associated with said generator for displacing the generator to a non-signal generating position, and control means operatively connected with said actuating means which when operated in one manner effect said actuating means so that no signal is available from the course change responsive means for rudder servomotor control and which when operated in another manner effect said actuating means so that a signal is available to control the rudder servomotor, a turn control means, comprising a displaceable turn signal generator for controlling the servomotor, a manually operable control member connected to said turn signal generator for displacing the latter and means operatively connected with said control means and said manually operable member and operable by said manually operable member for affecting the actuating means so that no signal is available from said first signal generator.

21. In an aircraft automatic pilot having a surface displacing motor and position change responsive means connected to said motor for operating the latter, said position change responsive means including a displaceable signal generator, an actuating means normally operatively disconnected from said generator but capable of being operatively connected with said generator for displacing the latter to a non-signal generating position, and control means connected with said actuating means which when operated in one manner operatively connects the actuating means and generator to make the actuating means effective on said generator to displace the latter whereby no signal is available from the position change responsive means for motor control and which when operated in another manner operatively disconnects the actuating means and generator to make the actuating means ineffective on said generator whereby the signal of the latter controls the motor, a turn control means comprising a displaceable position change signal generator for controlling the motor, a manually operable control member operatively connected with said position change signal generator for displacing the latter, and means operatively connected with said control means and said manually operable member and operable by said manually operable member for making the actuating means effective on said first mentioned signal generator.

22. In a system for controlling dirigible craft with a sensitive stable reference instrument, a pick-off with an element normally operatively connected to the instrument and an element fixed to the craft providing a controlling output with departure of the elements from a centralized relation relative to one another; means for resetting the system including a disengageable connection between the instrument and element of the pick-off normally operatively connected thereto, a normally ineffective device for disengaging said connection and for centralizing the elements of the pick-off only when disengaged whereby no torque is exerted on said instrument, and controllable means for rendering said normally ineffective device effective to simultaneously disengage said connection and centralize the elements of the pick-off, whereby upon release of said controllable means said device becomes effective to maintain the craft upon the course present at the time of said release.

23. In an aircraft automatic pilot having a servomotor adapted to change craft position and position change responsive means connected to said servomotor for controlling the motor, the position change responsive means including a first signal generator having a part displaceable relative to the craft, actuating means including a member operatively movable or held fixed relative to the craft and associated with said first generator for displacing the said displaceable part of the generator to a non-signal generating position when the member is movable relative to craft, and control means operatively connected with said actuating means which when operated in one manner effects the member of said actuating means rendering it movable relative to the craft so that no signal is available from the position change responsive means for servomotor control and which when operated in another manner effects the member of said actuating means so that it is held fixed relative to the craft and preventing any movement thereof so that a signal is available to control the servomotor, a selective position change control means, comprising a selectively displaceable signal generator for controlling the servomotor, a manually operable control member connected to said selectively displaceable signal generator for displacing the latter, and means operatively connected with said selective position change control means and said manually operable member and operable by said manually operable member for affecting the movable member of the actuating means so that no signal is available from said first signal generator.

24. In an aircraft automatic pilot having a surface displacing motor and position change responsive means connected to said motor for operating the latter, said position change responsive means including a signal generator having a relatively fixed part and a displaceable part, an actuating means having a movable member immovable or movable relative to the craft and operatively connected with said generator for displacing the displaceable part to a non-signal generating position, and control means connected with said actuating means which when operated in one manner makes the member of the actuating means movable relative to the craft and effective on the part of said generator to displace the latter whereby no signal is available from the position change responsive means for motor control and which when operated in another manner makes the member of the actuating means immovable relative to the craft and ineffective on the part of said generator whereby the signal of the latter controls the motor, a turn control means comprising a displaceable position change signal generator for controlling the motor, a manually operable control member operatively connected with said position change signal generator for displacing the latter, and means operatively connected with said control means and said manually operable member and operable by said manually operable member for making the actuating means effective on said first mentioned signal generator.

25. In an aircraft automatic pilot having a surface displacing motor and position change responsive means connected to said motor for operating the latter, said position change responsive means including a displaceable signal generator, an actuating means, said actuating means including a member alternatively selectively fixed or movable relative to the craft and operatively connected with said generator for displacing the latter to a non-signal generating position, and control means connected with said actuating means which when operated in one manner makes the member of actuating means movable relative to the craft and effective on said generator to displace the latter whereby no signal is available from the position change responsive means for motor control and which when operated in another manner alternatively makes the member of the actuating means fixed relative to the craft and ineffective on said generator whereby the signal of the latter controls the motor, a turn control means comprising a displaceable position change signal generator for controlling the motor, a manually operable control member operatively connected with said position change signal generator for displacing the latter, and means operatively connected with said control means and said manually operable member and operable by said manually operable member for making the actuating means effective on said first mentioned signal generator.

26. The aircraft automatic pilot having an attitude controlling servomotor and position change responsive means connected to said motor for operating the latter, said position change responsive means including a signal generator having a part displaceable relative to craft, an actuating means alternatively and selectively fixed or movable relative to the craft and operatively connected with said generator for displacing the latter relative to the craft to a non-signal generating position, and control means connected with said actuating means which when selectively operated in one manner makes the actuating means movable relative to the craft and effective on the part of said generator to displace the latter relative to the craft whereby no signal is available from the position change responsive means for motor control and which when operated in another manner alternatively makes the actuating means fixed relative to the craft and ineffective on the part of said generator whereby the signal of the latter controls the motor, and means operatively connected with said control means for making the actuating means effective on said signal generator.

27. In an aircraft automatic pilot having an attitude controlling servomotor and position change responsive means connected to said motor for operating the latter, said position change responsive means including a displaceable signal generator, and actuating means operatively connected with said generator for displacing the latter to a non-signal generating position, and control means connected with said actuating means which when operated in one manner enables the actuating means to apply an effort on said generator to displace the latter whereby no signal is available from the position change responsive means for motor control and which when operated in another manner makes the actuating means unable to apply an effort on said generator when displaced whereby the signal of the latter controls the motor, a turn control means comprising a displaceable position change signal generator for controlling the motor, a manually operable control member operatively connected with said position change signal generator for displacing the latter, and means operatively connected with said control means and said manually operable member and operable by said manually operable member for making the actuating means apply an effort on said first mentioned signal generator.

28. In an aircraft automatic pilot having a servomotor adapted to change craft position and position change responsive means connected to said servomotor for controlling the motor, the position change responsive means including a first signal generator having a part displaceable relative to the craft, an actuating means including a movable member for moving said displaceable part of the signal generator to a non-signal generating position, control means for affecting the operation of the movable member of said actuating means, said control means having two conditions of operation, said control means exerting a position maintaining force on said movable member preventing any movement thereof under a first condition of operation and exerting no force on said movable member when under a second condition of operation, said signal generator thus being capable of providing a signal for controlling said servomotor when said control means is under the first condition of operation and incapable of providing a control signal for said servomotor when said control means is under the second condition of operation, a selective position change control means, comprising a selectively displaceable signal generator for controlling the servomotor, a manually operable control member connected to said selectively displaceable signal generator for dispacing the latter, and means operatively connected with said selective position change control means and said manually operable member and operable by said manually operable member for affecting the movable member of the actuating means so that no signal is available from said first signal generator.

29. In a system for controlling dirigible craft with a sensitive stable reference instrument, a pickoff with an element normally operatively connected to the instrument and an element fixed to the craft providing a controlling output with departure of the elements from a centralized relation relative to one another; means for resetting the system including a disengageable connection between the instrument and element of the pickoff normally operatively connected thereto, normally ineffective means for disengaging said connection and for centralizing the elements of the pickoff only when disengaged whereby no torque is exerted on said instrument, and controllable means having an initial position and movable therefrom for rendering said normally ineffective means effective to simultaneously disengage said connection and centralize the elements of the pickoff, whereby upon return of said controllable means to said initial position said normally ineffective means become effective to maintain the craft upon the course present at the time of said return.

References Cited in the file of this patent

UNITED STATES PATENTS

| | | |
|---|---|---|
| Re. 21,806 | Johnson | May 20, 1941 |
| 1,436,280 | Minorsky | Nov. 21, 1922 |
| 2,051,974 | Warner | Aug. 25, 1936 |
| 2,443,748 | Sanders et al. | June 22, 1948 |
| 2,446,546 | Meston | Aug. 10, 1948 |
| 2,471,637 | MacCallum | May 31, 1949 |